United States Patent
Allen (10) Patent No.: US 7,940,961 B2
(45) Date of Patent: May 10, 2011

(54) METHOD FOR ENHANCING GROUND-BASED DETECTION OF A MOVING OBJECT

(75) Inventor: Jason Robert Allen, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 809 days.

(21) Appl. No.: 11/961,582

(22) Filed: Dec. 20, 2007

(65) Prior Publication Data

US 2009/0161981 A1 Jun. 25, 2009

(51) Int. Cl.
*G06K 9/00* (2006.01)
(52) U.S. Cl. ........ 382/103; 382/107; 382/275; 348/143; 348/169
(58) Field of Classification Search .................. 382/103, 382/107, 275, 224, 199, 167, 281, 164, 173, 382/100; 348/143, 169

See application file for complete search history.

(56) References Cited

U.S. PATENT DOCUMENTS

| | | | | |
|---|---|---|---|---|
| 6,579,818 | B2 * | 6/2003 | Kawai et al. | 501/32 |
| 7,133,537 | B1 * | 11/2006 | Reid | 382/103 |
| 7,336,803 | B2 * | 2/2008 | Mittal et al. | 382/103 |
| 7,565,858 | B2 * | 7/2009 | Boyd et al. | 89/1.1 |
| 2007/0086621 | A1 * | 4/2007 | Aggarwal et al. | 382/103 |
| 2008/0273751 | A1 * | 11/2008 | Yuan et al. | 382/103 |

OTHER PUBLICATIONS

Detecting Independent Motion:The statistics of temporal Continuity, Pless et al; Aug. 2000.*

* cited by examiner

*Primary Examiner* — Daniel G Mariam
*Assistant Examiner* — Nancy Bitar
(74) *Attorney, Agent, or Firm* — David S. Kalmbaugh (57) ABSTRACT

A method for enhancing detection of a moving object. The method includes comparing a video image to a historical sequence of images obtained from the same scene or stationary source. The method uses statistical sampling to implement change detection and thresholding operations which extract moving objects from the scene. The method provides for a high degree of sensitivity and noise rejection to motion detection, and is self-adapting to variations in sensor characteristics and operating environments.

21 Claims, 6 Drawing Sheets

METHOD FOR ENHANCING GROUND-BASED DETECTION OF A MOVING OBJECT

BACKGROUND OF THE INVENTION

1. Field of the Invention

The present invention relates generally to detection of a moving object. More specifically, the present invention relates to a method which enhances a ground-based or other stationary sensor's ability to detect moving objects.

2. Description of the Prior Art

Motion detection is generally accomplished with a fixed field-of-view (FOV) sensor utilizing a focal plane array (FPA). Currently, most change detection algorithms use straight frame-to-frame differencing (sometimes multiple times over) to achieve the desired effect of detecting a moving object. This approach can have a high degree of sensitivity, but often suffers from degraded noise rejection capabilities and must be tailored to a specific sensor's characteristics, and image-space environment.

The different sensor characteristics affecting performance may include the spectral band of sensitivity, degree of sensitivity, frame rate, noise equivalent irradiance (NEI), and number of focal plane array elements. Image-space environment differences affecting motion detection may include the level or amount of non-target clutter which is contrast variation in the scene, ambient lighting conditions, and object feature shapes.

One possibility for a motion detection of an object is to use an algorithm or method that is statistically based. An algorithm or method that is statistically based may provide for enhanced motion detection capability of both very bright objects and objects that are not bright when in the presence of background clutter or noise.

SUMMARY OF THE INVENTION

The basic components of the method for detecting moving objects comprise: (1) performing change detection to extract moving objects, (2) thresholding the results of this operation to extract bright objects, and (3) analyzing the results to obtain the objects' positions in the image space being scanned by a sensor. In addition, the method implements a feedback loop to adjust the threshold level of future images based on the amount of clutter coming through the threshold process.

The method comprising the present invention uses a statistical sampling technique to implement change detection and threshold operations for extracting the bright, moving objects from the scene. The intensity of each pixel in a newly acquired image is examined and compared to the pixel's own recent temporal history to determine if that pixel is an outlier pixel in the new image. If a pixel's intensity exceeds its own historical average by a certain number of standard deviations, then the pixel is thresholded as an outlier pixel. Depending upon whether it is of interest to a user to identify bright moving objects or dark moving objects, the thresholding operation is setup to accept either positive outliers or negative outliers, respectively. Upon completing this process for each pixel in the new image of a scene, a binary image of the outlier pixels is created composing the bright or dark moving objects or both in the scene.

The regions of the newly acquired image that are determined to be outlier pixels are not immediately incorporated into the temporal history of the scene. Instead, outlier pixel regions are weighted into the temporal statistics of the scene using an exponential function. For each successive frame, in which a region is found to be an outlier pixel region, that region is weighted higher. This region is weighted higher (for each successive frame) when determining temporal statistics of the scene, until eventually this region of the newly acquired image is included in its entirety in the statistical calculations.

The resulting binary image can then be analyzed to determine the shape and location of each object detected to further assist in determining which objects are of interest.

Finally, the number of objects detected in the new image of the scene are used to adjust the threshold level (number of standard deviations above the mean). The adjustment to the threshold level is then used to process future images of a scene.

The method of the present invention strives to output a constant number of detections that is specified by a system parameter. If the number of detections in the new image is below the desired amount, the threshold level is lowered, allowing more objects through the detection process. Similarly, if the number of detections in the new image is above the desired amount, the threshold level is raised, filtering out more objects from the detection process. This assist in maximizing the probability of detection for the system, especially in long-range observations, while still maintaining a reasonable processing load.

DETAILED DESCRIPTION OF A PREFERRED EMBODIMENT

Figure 1:
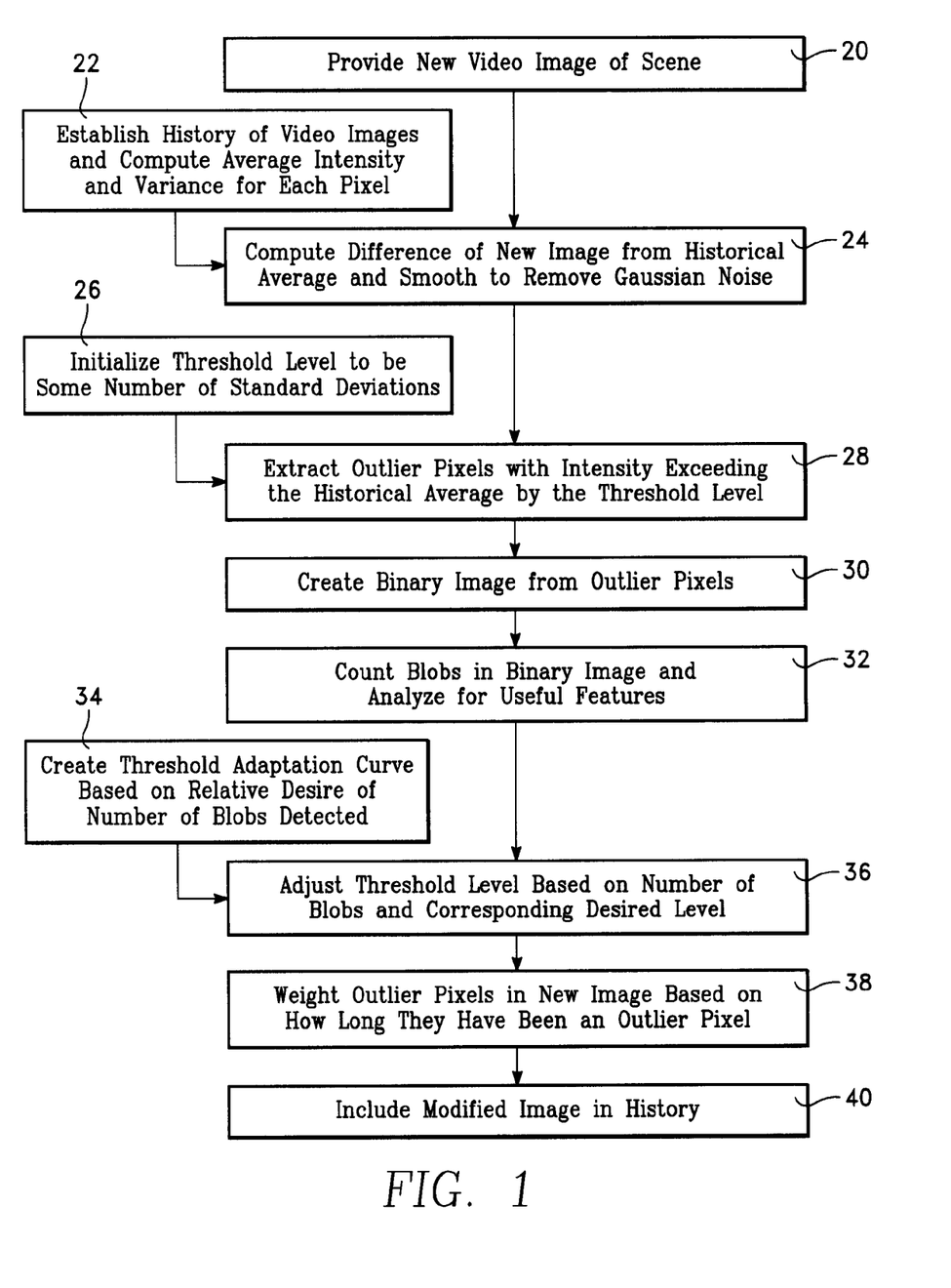
FIG. 1 illustrates a flow chart for the method for enhancing ground-based motion detection of a moving object comprising the present invention.

Referring first to FIG. 1, there is shown a flow chart which depicts a method for enhancing ground-based detection of a moving object comprising the present invention. The method illustrated by the flow chart of FIG. 1 is designed to accurately and consistently locate bright, moving objects within the FOV (field of view) by analyzing a sequence of digital images captured by a sensor, while minimizing the effects of undesired background clutter. For the method illustrated in FIG. 1, the image characteristics of importance are (1) the level of contrast between the objects of interest and the background, and (2) the motion of the objects of interest apparent to the sensor observing movement by the objects of interest. To exploit these characteristics, the method of FIG. 1 is designed to extract those objects from a scene that are bright and exhibiting adequate motion to detect movement. However, parameters can be changed that would allow extraction of dark objects, or objects exhibiting smaller amounts of motion.

Program step 20 of the method of FIG. 1 provides a new video image of a scene for comparison. Program step 22 of the method establishes a history for video images of the scene being observed by the sensor and computes the average intensity and variance for each pixel in the scene being observed. Video images are acquired by a sensor and used to build a temporal history of the scene being observed by the sensor. The average intensity represents the background of the scene which includes those elements in the scene that are constant or change very little, while the variance represents the background noise level present in each pixel region of the scene. As a new image is acquired by a sensor and then processed, it is included in the history of video images. The oldest video image is replaced with the newest video image. In this manner, the background image history contains a moving average of the scene being observed by the sensor. A digital processor can be used to process the video image data of the scene provided by the sensor and also to store video images which are used to establish the history of video images set forth in step 22.

Program step 24 of the method of FIG. 1 computes the difference of a new image of the scene from the historical average and then will smooth the difference to remove Gaussian noise. When a new image of the scene is acquired, changes are extracted by subtracting the background which is the average of the history of the scene from the new image. The result is a difference image that holds and provides the level of change present in each pixel for the new image. The difference image is then processed with a smoothing convolution to reduce the effects of Gaussian noise which is common in digital imagery.

Figure 2:
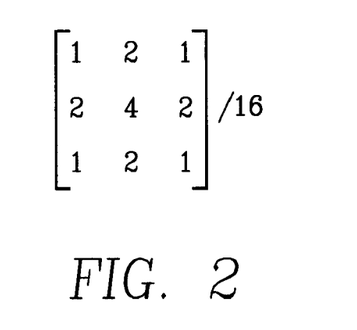
FIG. 2 illustrates an example of a convolution kernel that can be used to reduce the effects of Gaussian noise that is common in digital imagery.

Referring to FIG. 2, FIG. 2 shows an example of a standard smoothing/convolution kernel that can be used to accomplish the smoothing convolution process reducing the effects of Gaussian noise on the image. Convolution kernels are templates used to modify a pixel based on its surrounding neighbors. The template, which in FIG. 2 is 3×3 divided by 16, is usually located over the pixel being processed, which for FIG. 2 is the center pixel. The pixels in the region are multiplied by the corresponding kernel coefficients which by row are 1,2,1, 2,4,2, and 1,2,1. The product is summed and then divided by 16 to renormalize the output pixel value.

Program steps 26 and 28 of the method of FIG. 1 threshold the difference image by comparing each pixel in the scene to the pixel's corresponding historical variance. Program step 26 first initializes the threshold level to a value which is a number of standard deviations. The standard deviation of a pixel is the square root of the variance of the pixel. The variance for each pixel in the scene was computed from the image history in program step 22. Variance is generally computed as the average squared deviation of each number from its mean.

Program step 28 extracts outlier pixels with an intensity exceeding the historical average by the threshold level. A pixel is marked as an outlier pixel if its difference intensity exceeds the threshold level of standard deviations of the history which is computed in step 22. Both positive and negative outlier pixels with the scene are located using this technique. Before processing begins, the threshold level which is the standard deviations multiplier is initialized to a selected value.

Program step 30 of the method creates a binary image by highlighting only the pixels in the scene marked as positive outlier pixels. The pixels in the scene marked as positive outlier pixels represent bright objects moving through the scene. Pixels marked as negative outlier pixels correspond to dark objects moving through the scene.

It should be understood that in program step 30 either positive or negative outlier pixels or both can be used to create the binary image, depending on the desired outcome of the application. As an optional step to program step 30, the binary image may be further processed by morphological operations such as opening, closing, eroding, or dilating, to aid in feature extraction of an object of interest.

In program step 32, the binary image is analyzed to determine the number of blobs, which are highlighted pixel groupings, present in the image. During program step 32 additional blob features such as pixel location, i.e. pixel coordinates of an object's centroid, intensity, size, and shape are evaluated.

The number of blobs found in the binary image are used as a feedback control to adjust the threshold level for processing of the next image of the scene acquired by a sensor (program step 36). If the number of blobs found in the binary image is more than the desired amount of blobs, the threshold level is raised to suppress the number of blobs in the scene. However, if the number of blobs found in the scene is less than the desired amount, the threshold level is lowered to allow more moving objects to be detected within the scene.

Program step 34 creates a threshold adaptation curve 42 which is based on a relative desire by the user of the number of blobs to be detected within the scene. A relationship is defined by the user before processing begins to allow the method of FIG. 1 to adjust the threshold level for a given number of blobs found in the new image. The curve 42 of FIG. 3 is a user generated curve.

Figure 3:
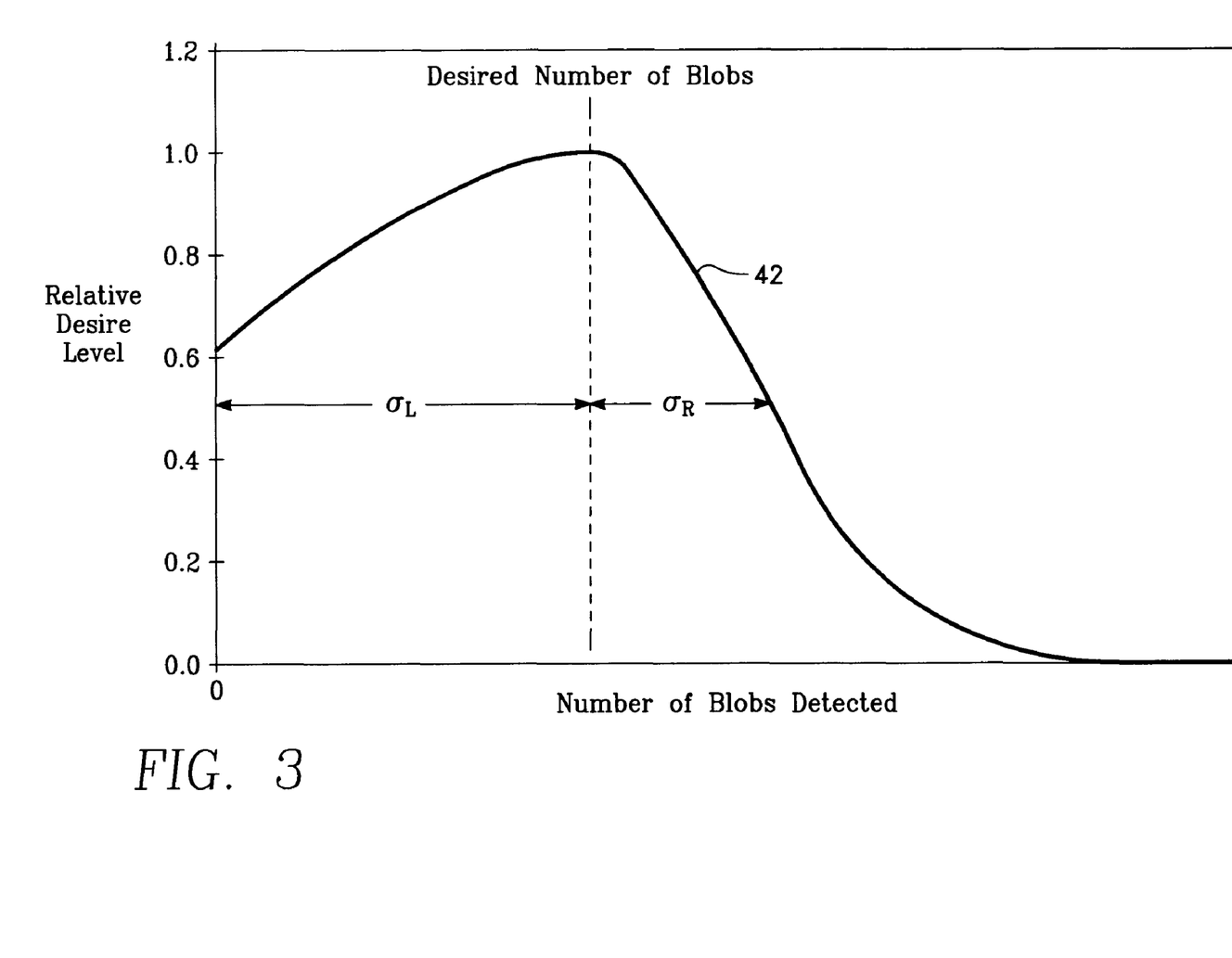
FIG. 3 is a user generated curve which illustrates the desired number of blobs in a scene as a function of the number of blobs detected.

Curve 42 of FIG. 3 has a range from zero out to an anticipated maximum number of blobs to be detected which is the X-axis for curve 42. The Y-axis has a value between 0 and 1.0 for a given blob count. Curve 42 can take any shape, depending on the desired response of a threshold adjustment feedback loop. One useful form for curve 42 is a two-sided Gaussian curve centered on the desired number of blobs to be detected in the scene. The shape of the Gaussian curve provides for a smooth response that helps prevent the threshold level from oscillating. Using different values for the standard deviation on either side of curve 42 allows for a different response in situations where it is not equally desirable to have too many blobs detected as it is to have too few blobs detected.

The curve 42 peaks at the desired number of blobs to be detected and falls off at different rates for blob counts above the desired number and below this number. For the curve 42 of FIG. 3, the slope to the right of the desired number of blobs is substantially steeper than the slope to the left of the desired number of blobs. For Gaussian curve 42 of FIG. 3, it is less desirable to have too many blobs detected, as it is to have too few blobs detected, so the standard deviation $\sigma_R$ of the right side of the curve 42 is smaller than the standard deviation $\sigma_L$ of the left side of the curve 42.

Figure 4:
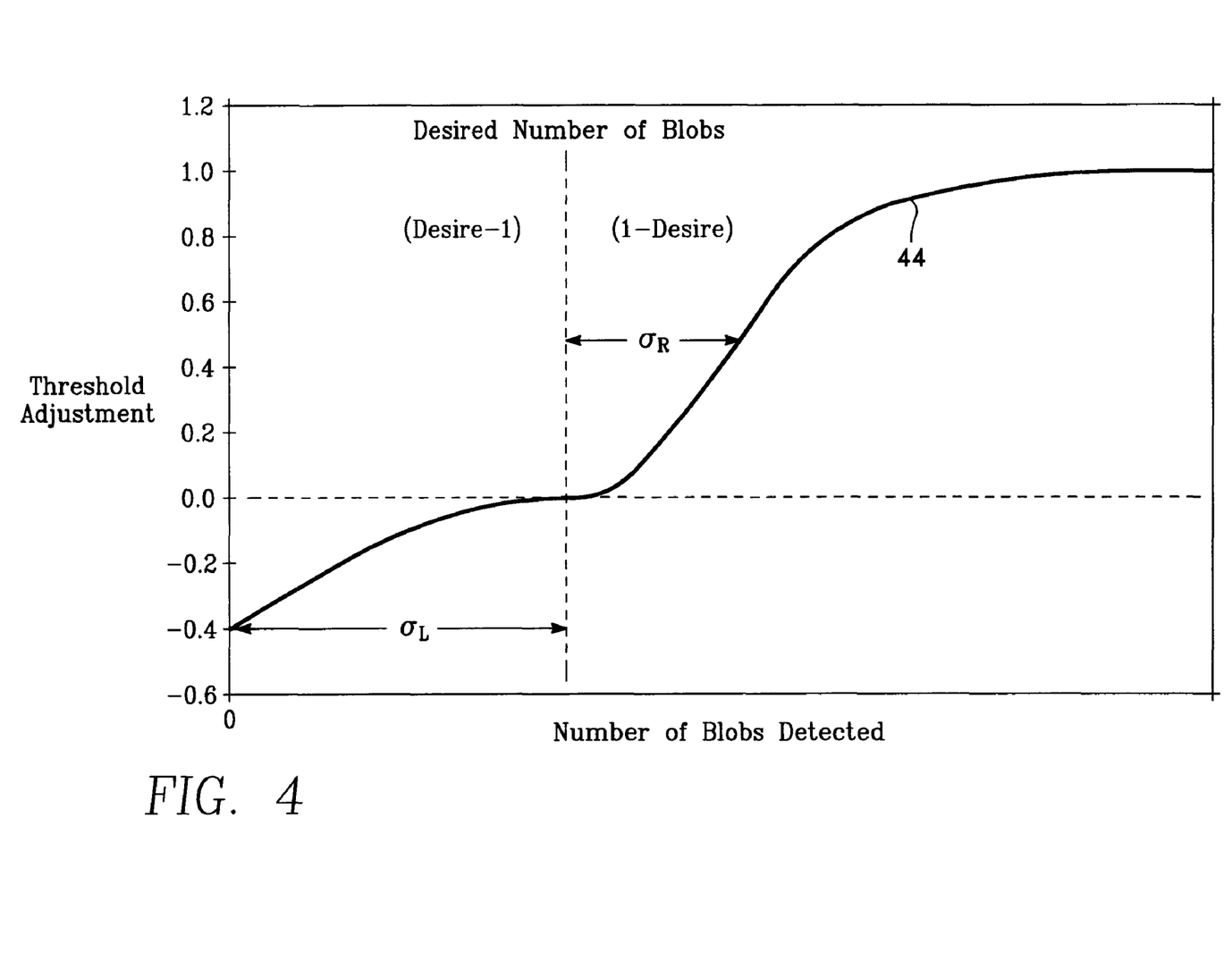
FIG. 4 is a threshold adjustment curve which is generated from and corresponds to the curve of FIG. 3.

Curve 42 is then used to build a threshold adjustment curve 44 which is illustrated in FIG. 4. Curve 44 is used to raise or lower the threshold depending on the number of blobs found in the most recent image that was processed. FIG. 4 shows the threshold adjustment curve 44 corresponding to the desire curve 42 of FIG. 3.

For blob counts at or below the desired number of blobs, the Y-axis of the threshold adjustment curve 44 is computed by subtracting one from the value of the Y-axis of curve 42 (desire curve 42-1). For blob counts above the desired number of blobs the Y-axis of the threshold adjustment curve 44 is computed by subtracting the value of the desire curve from one (1—desire curve 42). For example, if only one blob is found in a scene then the relative desire level is about 0.6 resulting in a threshold adjustment of −0.4 (0.6−1).

The threshold adjustment value is defined for every blob count. When the blob count is found in the new image, the threshold adjustment is added to the threshold (number of standard deviations) to obtain a new threshold level. From the curve in FIG. 4, it can be observed that a blob count below our desired number will lower the threshold, allowing more pixels to be highlighted, while a blob count above our desired number will raise the threshold, preventing more pixels from being included in the binary image.

The threshold adjustment curve can be scaled by a multiplier to achieve a different response, depending on the application. Both the desire curve and the threshold adjustment curve can be created and initialized before processing begins, or can be computed over time to afford additional flexibility.

Figure 4A:
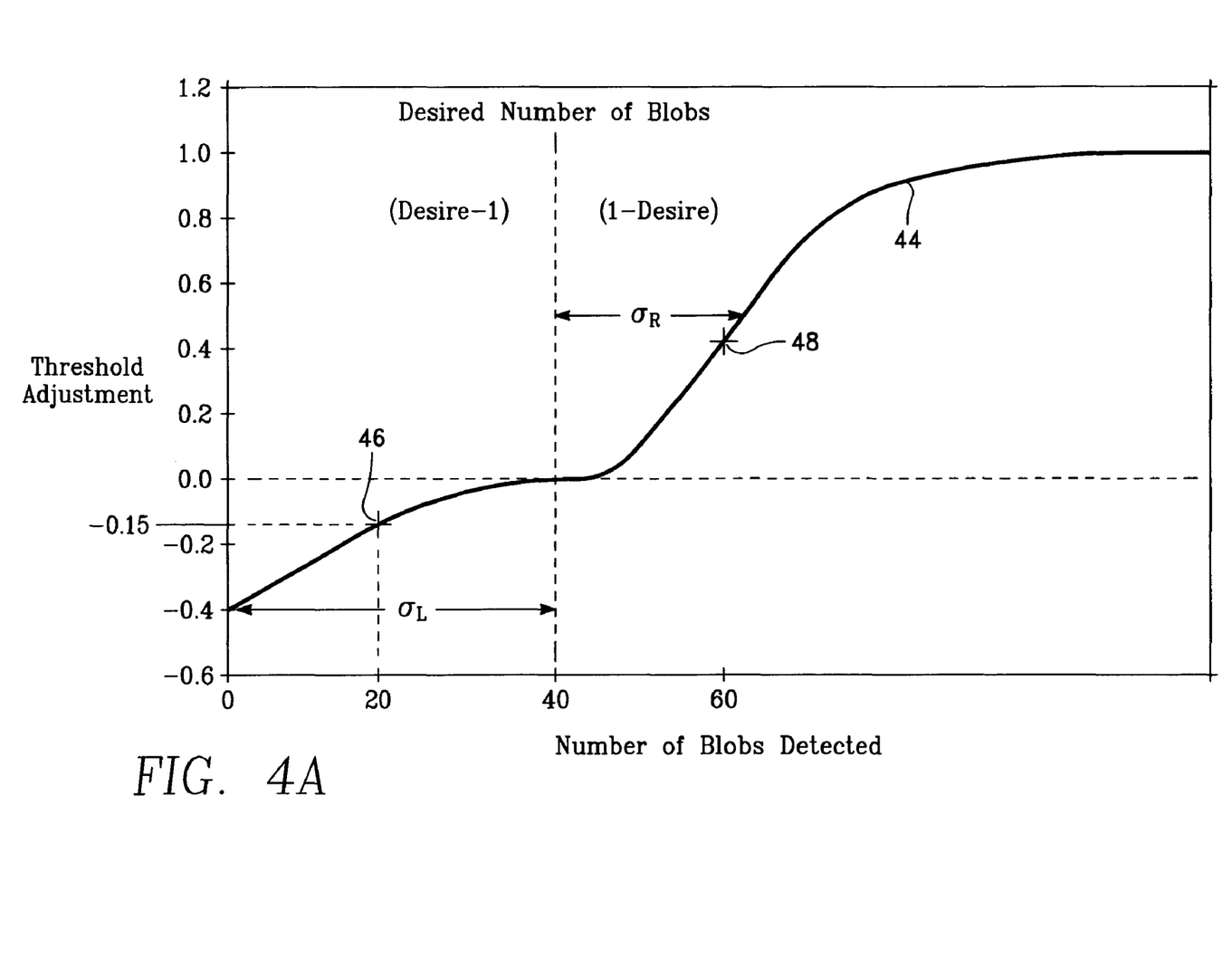
FIG. 4A is an example of the use of the threshold adjustment curve of FIG. 4.

FIG. 4A illustrates the use of the threshold adjustment curve of FIG. 4 for a particular example where the desired number of blobs to appear in an image is set at forty. When only twenty blobs are located the threshold adjustment is −0.15 (Y-axis of curve 44). When, however, sixty blobs are located the threshold adjustment is about +0.4.

As an example, suppose the threshold L is equal to eight. When only twenty blobs are located, and the threshold adjustment is −0.15, there is an adjustment downward for L to 7.85 (L=8−0.15=7.85).

Similarly, if L is equal to eight when sixty blobs are located, and the threshold adjustment is +0.4, there is an adjustment upward for L to 8.40 (L=8+0.40=8.40). The adjustment downward of the threshold L allows more pixels to be highlighted and the adjustment upward of the threshold L excludes pixels from an image.

Before a new image is included in the image history, it is modified to prevent outlier pixels from adversely affecting the background scene. A transient object that travels through the scene will affect the mean and variance for the background scene if it is directly folded into the image history. Since it is desired that the background statistics represent the portions of the scene that are unchanging, the method of FIG. 1 must remove the outlier pixels from the new image before including the outlier pixels in the history.

In addition, the method of FIG. 1 must process those cases where the background changes, for example, if a moving object comes to rest in the scene and remains in the scene. To accommodate both transient objects and permanent changes in the background, a weighting function is provided to gradually include outlier pixels into the history of a scene. This requires a pixel to be a persistent outlier pixel for a period of time before the outlier pixel becomes a part of the background scene.

A weighting image is maintained with a weight factor for each pixel in a scene. Each pixel has its weight factor initialized to a value of 1. Pixels found to be outliers have their weight factor doubled up to some maximum weight factor. The weight applied to the outlier pixels is the pixel's weight factor divided by the maximum weight factor. The weighted value for an outlier pixel is defined by:

WEIGHTED=AVERAGE+ (WEIGHT*DIFFERENCE)

where AVERAGE is the historical average intensity value for the pixel, DIFFERENCE is the intensity value of the pixel in the difference image previously computed as the new image minus the historical average, and WEIGHT is the pixel's weight factor divided by the maximum weight factor:

WEIGHT=(WEIGHT FACTOR)/(MAXIMUM WEIGHT FACTOR)

The weight factor is calculated as $2^N$, where N is the number of consecutive frames the pixel has been an outlier. The maximum weight factor is calculated as $2^{Nmax}$, where $N_{MAX}$ is the maximum number of frames to allow a pixel to be considered an outlier.

Figure 5:
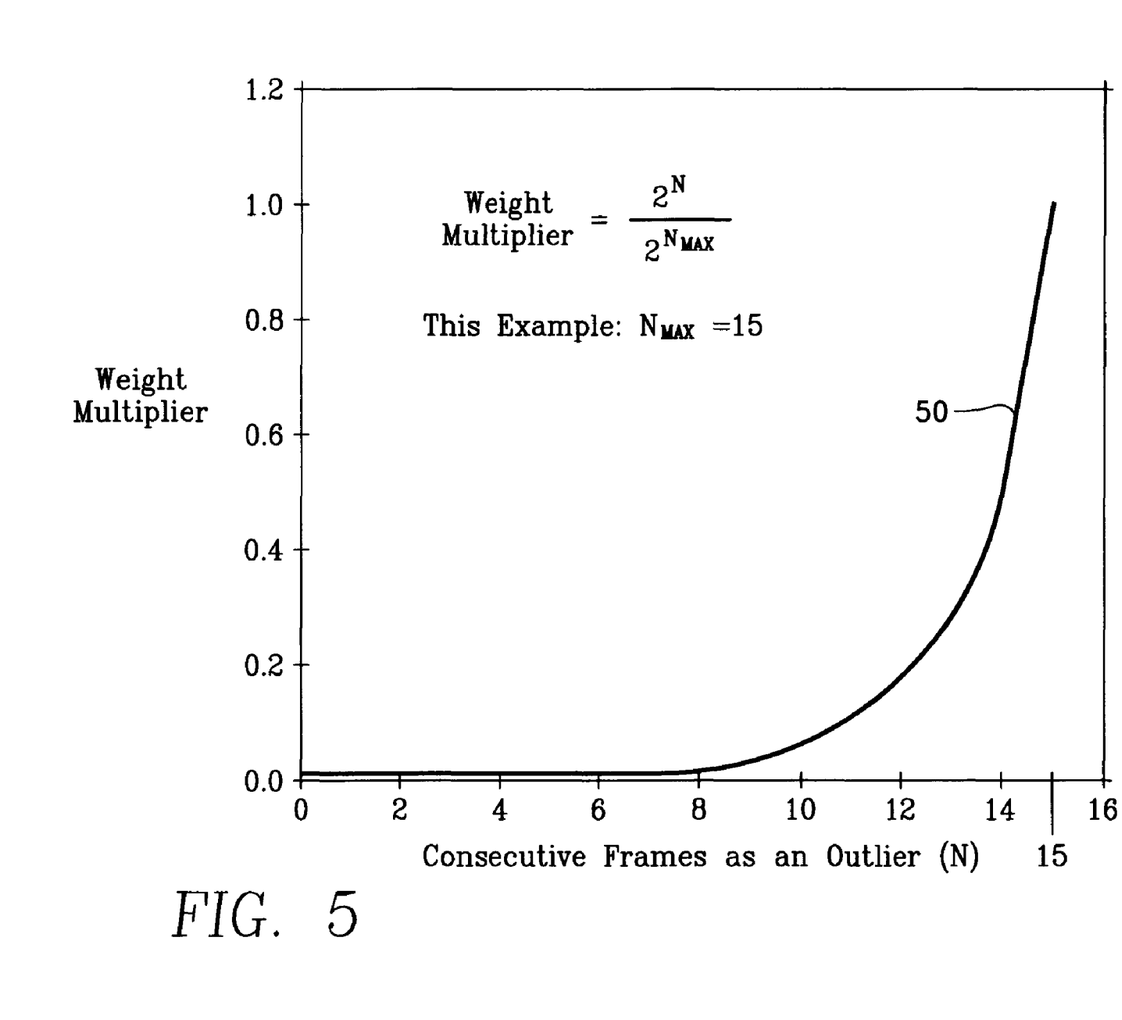
FIG. 5 depicts an example response for an outlier pixel weighting technique used in the present invention.

Referring to FIG. 5, program step 38 provides for a weighting of outlier pixels in a new image based on the length of time a pixel has been an outlier pixel. The curve 50 of FIG. 5 illustrates a weight multiplier for a pixel based on the number of consecutive frames the pixel is an outlier pixel. At fifteen consecutive times an outlier has a weight multiplier of one using the following formula:

$$\text{WEIGHT} = \frac{2^N}{2^{N_{MAX}}} \quad (1)$$

where N is the number of consecutive frames a pixel is an outlier pixel, and $N_{MAX}$ is 15 frames.

FIG. 5 is an example response curve for the outlier weighting scheme described, with $N_{MAX}$=15 frames. An examination of FIG. 5 shows that outlier pixels are not weighted or minimally weighted into the history at first. Until an outlier pixels appears in a frame at least eight times the weight multiplier is about zero. Until an outlier pixel appears in a frame twelve times the weighting factor is not significant. When an outlier pixel appears in a frame fifteen times the pixels becomes part of the scene in accordance with equation one.

Program step 40 includes the modified image in the history. Weights for positive and negative outlier pixels are maintained separately such that if a pixel that has been a positive outlier pixel becomes a negative outlier pixel, the weight for the pixel is reset. This also occurs for pixels which are negative outlier pixels and then become positive outlier pixels. A pixel's weight is also reset if it is not an outlier.

Once a new image is modified by weighting its outlier pixels, the image is included in the history by replacing the oldest image in the history with the new image. This gives an image history of a fixed length, which simplifies statistical calculations and improves the response of the algorithm. The method of FIG. 1 is repeated for subsequent images.

Figure 6:
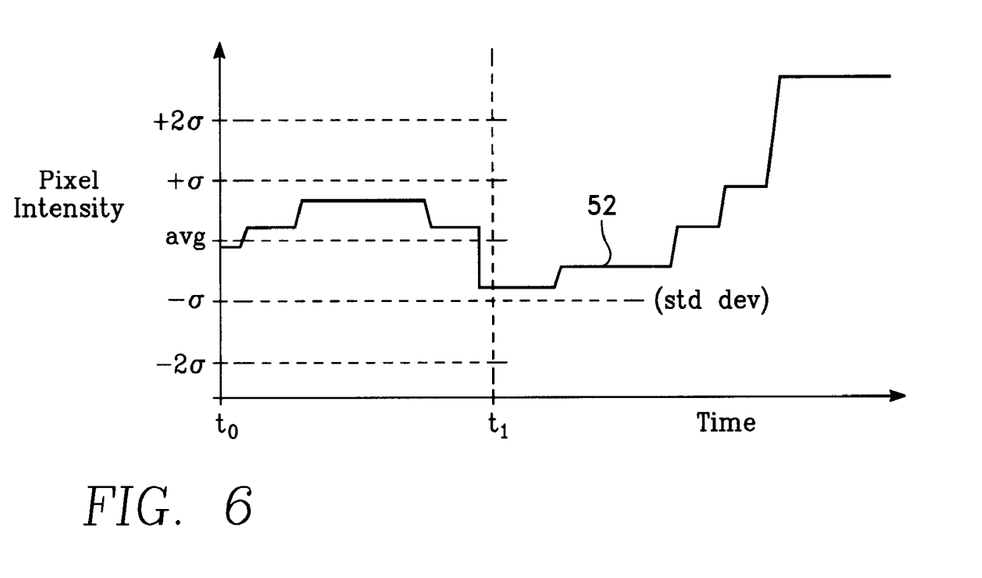
FIG. 6 illustrates an example of a pixel intensity versus time plot for one pixel within a scene over time.

Referring to FIG. 6, FIG. 6 illustrates a plot 52 for a pixel's intensity (Y-axis) as a function of time (x-axis). The data from a sensor is processed to generate plot 52 which pixel intensity over time. From plot 52 the average pixel intensity and variance are calculated. Variance is normally computed as the average squared deviation of each number from its mean as expressed by the following equation.

$$\sigma^2 = \frac{\sum (X - \mu)^2}{N} \quad (2)$$

where $\mu$ is the mean of the sample and N is the number of pixel intensity measurements as a function of time in the sample.

A formula used in the preferred embodiment for calculating variance of a variable X in a set of pixel intensity data is as follows:

$$\sigma^2 = \frac{N \cdot \sum X^2 - \left(\sum X\right)^2}{N^2} \quad (3)$$

where N is the number of pixel intensity measurements as a function of time in the sample. The standard deviation σ is the square root of the variance.

Each new sample is compared with the current statistics when locating an outlier pixel within the scene. The outlier pixel is calculated in accordance with the following expression:

$$\text{New Intensity} > \text{Average} + L \cdot \sigma \quad (3)$$

This expression states that a pixel is an outlier pixel when the new intensity for the pixel is greater than the average plus the threshold level times the standard deviation. Relating the formula of equation (3) to the difference image computed in program step 24 of FIG. 1, the following can be observed:

$$\text{Difference} = \text{new intensity} - \text{average} \quad (4)$$

Therefore the difference>(is greater than L·σ for outlier pixels.

The threshold level L is initialize upon startup. For example, at startup the threshold level can be initialized to eight.

It is also sometimes desirable that the threshold level L be limited to an upper and lower boundary, $L_{MAX}$ and $L_{MIN}$, respectively. Selecting upper and lower boundary limits further helps to avoid potential instability in the feedback of the threshold adaptation. $L_{MAX}$ and $L_{MIN}$ are also initialized upon startup. For example, for the plot of FIG. 4, the user can set $L_{MIN}$ to one and $L_{MAX}$ to 30.

The method comprising the present invention allows for the use of statistical sampling to achieve change detection and thresholding to detect the presence of a moving object in a scene. The method also provides for a high degree sensitivity and enhanced noise rejection capabilities. In addition, the method may be adapted to variations in the environment and sensor characteristics.

What is claimed is:

1. A method for enhancing the detection of moving objects within a scene comprising the steps of:
   (a) providing a video image of said scene, wherein said video image is a new video image of said scene provided by a sensor which monitors said scene;
   (b) establishing a history of video images of said scene, wherein said history of video images of said scene includes a plurality of pixels of the moving objects and background within said scene;
   (c) computing an average pixel intensity and a variance for each of said plurality of pixels within said scene;
   (d) computing a difference in pixel intensity of the new video image of said scene from a historical average for said scene and then smoothing said difference to remove Gaussian noise from said scene, wherein a scene difference image is created which holds and provides a level of change in the pixel intensity present in each of said pixels for the new video image of said scene;
   (e) initializing a threshold level for said pixel intensity to a value which is a selected number of standard deviations;
   (f) extracting outlier pixels from said scene, wherein the pixel intensity of said outlier pixels exceeds the historical average by said threshold level times the standard deviation of said outlier pixel, said outlier pixels representing moving objects within said scene;
   (g) creating a binary image from said outlier pixels within said scene, wherein the binary image of said outlier pixels comprises bright moving objects or dark moving objects in said scene, or both bright moving objects and dark moving objects in said scene;
   (h) analyzing said binary image to count blobs present in said binary image, wherein each of said blobs in said binary image comprises a highlighted pixel grouping within said binary image;
   (i) creating a threshold adaptation curve which is used to generate a threshold adjustment curve, said threshold adaptation curve being created by a user based on a relative desire by said user for the number of said blobs to be detected within said scene, wherein said user sets a relative desire level for the number of said blobs to be detected in said scene;
   (j) adjusting said threshold level for a next new video image of said scene, wherein the number of said blobs found in said binary image are used as a feedback control to adjust the threshold level for processing of the next new video image of said scene acquired by said sensor; and
   (k) weighting said outlier pixels in said new video image of said scene based on a length of time that each of said pixels in said new video image has been one of said outlier pixel.

2. The method of claim 1 further comprising the step of: updating the history of video images for said scene to include a modified video image of said scene, wherein said modified video image is produced by weighting said outlier pixels based on the length of time that each of said pixels in said new video image has been one of said outlier pixel.

3. The method of claim 1 wherein weighting of said outlier pixels is in accordance with the following expression:

$$\text{WEIGHT} = \frac{2^N}{2^{N_{\text{MAX}}}} \quad (1)$$

where N is the number of consecutive frames a pixel is an outlier pixel, and $N_{MAX}$ is the maximum number of times a response is expected.

4. The method of claim 3 further comprising the step of: replacing an oldest video image in said history of video images of said scene with the new video image of said scene, after the outlier pixels are weighted, providing an image history of a fixed length, which simplifies statistical calculations.

5. The method of claim 1 further comprising the step of using a convolution kernel to implement a smoothing convolution process which reduces the effects of said Gaussian noise on said scene difference image.

6. The method of claim 1 wherein said outlier pixels comprise positive outlier pixels and negative outlier pixels wherein said positive outlier pixels represent bright objects moving through said scene and said negative outlier pixels represent dark objects moving through said scene.

7. The method of claim 1 wherein each of said pixels within said scene is marked as one of said outlier pixels when the difference in said pixel intensity for said pixel exceeds a threshold level of standard deviations for said pixel for the history of video images of said scene.

8. The method of claim 1 wherein said threshold adaptation curve comprises a two-sided Gaussian curve centered on a desired number of said blobs to be detected in said scene.

9. The method of claim 8 wherein said two-sided Gaussian curve peaks at the desired number of said blobs to be detected and falls off at different rates for blob counts above and below the desired number of said blobs to be detected.

10. The method of claim 8 wherein said two-sided Gaussian curve peaks at the desired number of said blobs to be detected and falls off at identical rates for blob counts above and below the desired number of said blobs to be detected.

11. The method of claim 9 wherein the step of adjusting said threshold level for the next video image of said scene raises said threshold level when the number of said blobs found in said binary image is more than the desired number of said blobs, suppressing the number of said blobs in the next video image of said scene.

12. The method of claim 10 wherein the step of adjusting said threshold level for the next video image of said scene lowers said threshold level when the number of said blobs found in said binary image is less than the desired number of said blobs increasing the number of said blobs in the next video image of said scene which allows additional moving objects to be detected within the scene.

13. The method of claim 1, wherein said method for enhancing the detection of said moving objects is adjustable to variations in the environment and sensor characteristics including spectral band of sensitivity of said sensor, degree of sensitivity of said sensor, frame rate, noise equivalent irradiance (NEI), and number of focal plane array elements within said sensor.

14. The method of claim 1 wherein said method provides a significant improvement in background noise rejection capabilities and an enhancement in sensitivity when observing said moving objects within said scene.

15. The method of claim 1 further comprising the step of: providing an evaluation of blob features for said blobs in said new video image including pixel coordinates of a centroid for each of said moving objects, and intensity, size, and shape of said moving objects within said scene.

16. A method for enhancing the detection of moving objects within a scene comprising the steps of:
 (a) providing a video image of said scene, wherein said video image is a new video image of said scene provided by a sensor which monitors said scene;
 (b) establishing a history of video images of said scene, wherein said history of video images of said scene includes a plurality of pixels of the moving objects and background within said scene;
 (c) computing an average pixel intensity and a variance for each of said plurality of pixels within said scene;
 (d) computing a difference in pixel intensity of the new video image of said scene from a historical average for said scene and then smoothing said difference to remove Gaussian noise from said scene, wherein a scene difference image is created which holds and provides a level of change in the pixel intensity present in each of said pixels for the new video image of said scene;
 (e) using a convolution kernel to implement a smoothing convolution process which reduces the effects of said Gaussian noise on said difference image; (f) initializing a threshold level for said pixel intensity to a value which is a selected number of standard deviations;
 (g) extracting outlier pixels from said scene, wherein the pixel intensity of said outlier pixels exceeds the historical average by said threshold level times the standard deviation of said outlier pixel, said outlier pixels representing moving objects within said scene;
 (h) creating a binary image from said outlier pixels within said scene, wherein the binary image of said outlier pixels comprises bright moving objects or dark moving objects in said scene, or both bright moving objects and dark moving objects in said scene;
 (i) analyzing said binary image to count blobs present in said binary image, wherein each of said blobs in said binary image comprises a highlighted pixel grouping within said binary image;
 (j) creating a threshold adaptation curve which is used to generate a threshold adjustment curve, said threshold adaptation curve being created by a user based on a relative desire by said user for the number of said blobs to be detected within said scene, wherein said user sets a relative desire level for the number of said blobs to be detected in said scene;
 (k) adjusting said threshold level for the next video image of said scene, wherein the number of said blobs found in said binary image are used as a feedback control to adjust the threshold level for processing of the next video image of said scene acquired by said sensor;
 (l) weighting said outlier pixels in said new video image of said scene based on a length of time that each of said pixels in said new video image has been one of said outlier pixel
 (m) replacing an oldest video image in said history of video images of said scene with the new video image of said scene, after the outlier pixels are weighted, providing an image history of a fixed length, which simplifies statistical calculations; and
 (n) updating the history of video images for said scene to include a modified video image of said scene, wherein said modified video image is produced by weighting said outlier pixels based on the length of time that each of said pixels in said new video image has been one of said outlier pixel.

17. The method of claim 16 wherein said outlier pixels comprise positive outlier pixels and negative outlier pixels wherein said positive outlier pixels represent bright objects moving through said scene and said negative outlier pixels represent dark objects moving through said scene.

18. The method of claim 16 wherein said threshold adaptation curve comprises a two-sided Gaussian curve centered on a desired number of said blobs to be detected in said scene, said two-sided Gaussian curve peaking at the desired number of said blobs to be detected and falling off at different rates for blob counts above and below the desired number of said blobs to be detected.

19. The method of claim 16 wherein said threshold adaptation curve comprises a two-sided Gaussian curve centered on a desired number of said blobs to be detected in said scene, said two-sided Gaussian curve peaking at the desired number of said blobs to be detected and falling off at identical rates for blob counts above and below the desired number of said blobs to be detected.

20. The method of claim 18 wherein the step of adjusting said threshold level for the next video image of said scene raises said threshold level when the number of said blobs found in said binary image is more than the desired number of said blobs, suppressing the number of said blobs in the next video image of said scene, the step of adjusting said threshold level for the next video image of said scene lowering said threshold level when the number of said blobs found in said binary image is less than the desired number of said blobs increasing the number of said blobs in the next video image of said scene which allows additional moving objects to be detected within the scene.

21. The method of claim 16 wherein said method for enhancing the detection of said moving objects is adjustable to variations in the environment and sensor characteristics including spectral band of sensitivity of said sensor, degree of sensitivity of said sensor, frame rate, noise equivalent irradiance (NEI), and number of focal plane array elements within said sensor.

* * * * *